(12) United States Patent
Zegula

(10) Patent No.: US 7,852,071 B2
(45) Date of Patent: Dec. 14, 2010

(54) CONTROL ELEMENT FOR A MOTOR VEHICLE

(75) Inventor: Oliver Zegula, Bad Neustadt (DE)

(73) Assignee: Preh GmbH (DE)

( * ) Notice: Subject to any disclaimer, the term of this patent is extended or adjusted under 35 U.S.C. 154(b) by 0 days.

(21) Appl. No.: 12/018,180

(22) Filed: Jan. 22, 2008

(65) Prior Publication Data

US 2009/0015244 A1    Jan. 15, 2009

Related U.S. Application Data

(63) Continuation of application No. PCT/EP2006/007220, filed on Jul. 21, 2006.

(30) Foreign Application Priority Data

Jul. 21, 2005   (DE)   .................... 10 2005 033 983

(51) Int. Cl.
*G01B 7/30* (2006.01)
*H01L 43/06* (2006.01)
*G01R 33/07* (2006.01)

(52) U.S. Cl. ................ 324/207.25; 324/207.2

(58) Field of Classification Search ........... 324/207.2, 324/207.21, 207.25; 200/4, 11 R, 19, 36, 200/336, 345; 341/15, 32, 35
See application file for complete search history.

(56) References Cited

U.S. PATENT DOCUMENTS 4,054,860 A    10/1977  Henderson et al.
5,880,683 A *   3/1999  Brandestini .................... 341/10
6,188,332 B1    2/2001  Scarlata
6,326,781 B1 * 12/2001  Kunde et al. ............ 324/207.21
6,741,160 B1 *  5/2004  Dawson et al. ............. 340/5.55
6,864,679 B2 *  3/2005  Yokoji et al. ............ 324/207.11

FOREIGN PATENT DOCUMENTS

| DE | 81 30 371 U1 | 3/1982 |
| DE | 94 15 257 U1 | 1/1995 |
| DE | 101 26 077 A1 | 12/2002 |
| DE | 10126076 * | 12/2002 |
| DE | 103 04 804 A1 | 8/2003 |
| DE | 103 60 016 B3 | 7/2005 |
| DE | 20 2005 019 271 U1 | 3/2006 |
| JP | 406174410 A * | 6/1994 ............ 324/207.11 |
| JP | 410220443 A * | 8/1998 |

* cited by examiner

*Primary Examiner*—Kenneth J Whittington
(74) *Attorney, Agent, or Firm*—Cantor Colburn LLP

(57) ABSTRACT

A control element is provided for a motor vehicle, particularly a rotary actuator, having at least one pivoted control knob, an extension formed on the control knob, and an electrical device to detect the rotary movement of the control knob, whereby the electrical device works together with the extension of the control knob, and whereby the electrical device is formed of at feast two oppositely polarized magnets connected torsion-proof to the extension and by at least two sensors held stationary in the control element and detecting the magnetic field lines of the magnets.

10 Claims, 4 Drawing Sheets

CONTROL ELEMENT FOR A MOTOR VEHICLE

This nonprovisional application is a continuation of International Application No. PCT/EP2006/007220, which was filed on Jul. 21, 2006, and which claims priority to German Patent Application No. DE 102005033983, which was filed in Germany on Jul. 21, 2005, and which are both herein incorporated by reference.

BACKGROUND OF THE INVENTION

1. Field of the Invention

The present invention relates to a control element for a motor vehicle, particularly a rotary actuator, including at least one pivoted control knob, an extension formed on the control knob, and an electrical means to detect the rotary movement of the control knob, whereby the electric means works together with the control knob extension.

2. Description of the Background Art

Highly different systems are prior in the art to detect rotary movements at a rotary actuator in a motor vehicle. Thus, German Unexamined Pat. Application No. DE 103 04 804 A1 describes an electric switch, especially a joystick type switch or cursor type switch, which is also provided with means to detect a rotation of an operating element of the electric switch. On the pivoted operating element an extension is integrally formed at whose end tooth elements are formed in the shape of castle battlements. The tooth elements in this case act together with two light barriers, whose light is interrupted by the tooth elements during rotation of the operating element so that the movement is detectable. The two light barriers are arranged in such a way that the particular rotational direction of the operating element is detectable. It can be derived from the description that other sensory operating switching elements such as Hall sensors may also be used.

The use of Hall sensors to detect motion in a switch is described in German Utility Model No. DE 94 15 257 U1. A ferromagnetic object, located centrally above two Hall generators, is affixed on a lock cylinder. If rotation now occurs at the lock cylinder, then a tripping portion is moved to an off-center position relative to a Hall difference IC. In this position, a difference in the magnetic flux between the two Hall generators is perceived. Depending on whether the tripping portion is off-center to the left or right, the difference in the magnetic flux is positive or negative. Therefore, the use of Hall generators in combination with a ferromagnetic object and a permanent magnet is described.

German Utility Model No. DE 20 2005 019 271 U1 describes the use of Hall sensor elements to detect movement in a multi-stage contactless switch, particularly for a control element in a motor vehicle. A two-pole permanent magnet is disposed rotated around its central axis to a sensor axis on which the Hall sensors are attached. By means of a movement of the permanent magnet in relation to the sensor axis, the magnetic field detectable by the Hall sensors changes, so that a switching process is detectable.

SUMMARY OF THE INVENTION

It is therefore an object of the present invention to provide a control element that, on the one hand, enables the detection of the rotary movement and, on the other, is resistant to soiling, particularly dust. In addition, the operating element is to be made simple in structural terms, smooth-running, and economical to produce.

The object of the invention is attained in that the electrical means to detect the rotary movement of the control knob is formed of at least two oppositely polarized magnets, connected torsion-proof to the extension, and at least two sensors, held stationary in the control element and detecting the magnetic field lines of the magnets. The structure of the control element of the invention now makes it possible to provide a control element resistant to soiling. The magnets formed in the extension of the control knob work together with Hall sensors, which enable detection of the rotary movement regardless of dust and dirt. If the sensors detecting the magnetic field lines of the magnets are now disposed below the control knob in such a way that a different switch position is detectable for each rotary movement, determination of the direction of the rotary movement is thus possible simultaneously. The structurally simple layout results from the fact that the extension, formed on the control knob and in which the permanent magnets are contained, is formed as one piece to the extension. It is proposed in another advantageous embodiment to mount the control knob in its seat by means of a conventional, standardized mount, so that, in one respect, free movement is assured and the control element can be manufactured economically with the use of standardized parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
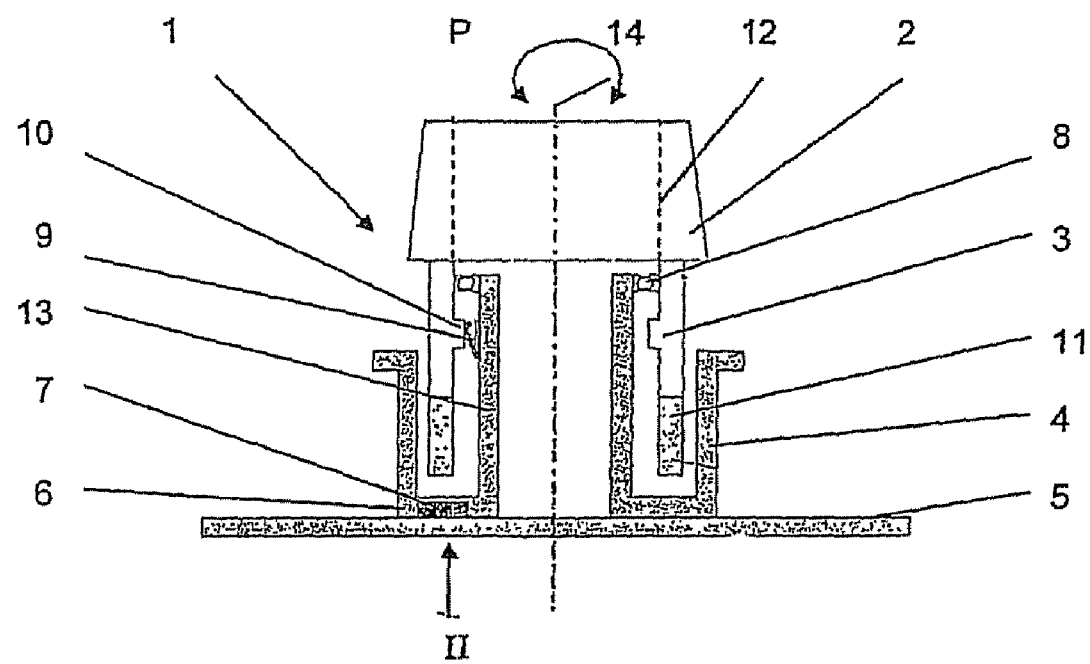
FIG. 1 shows a rotary actuator of the invention in the side view, which is cut in part.

Control element 1 equipped according to the invention is shown in the side view in FIG. 1 in a partially cut view. The control element in this case includes a control knob 2, an extension 3, formed on control knob 2, of a seat 4 arranged in a torsion-proof manner in control element 1 for control knob 2, whereby the seat is attached to a printed circuit board 5. A sensor 7, which detects the magnetic field lines of the magnets and in this exemplary embodiment is a Hall sensor, is attached to printed circuit board 5 in a recess 6 of seat 4. Control knob 2 is mounted by means of a mount 8 in seat 4. A detent contour 9, which works together with spring element 10 generating the detent force, is formed simultaneously on the control knob 2. Of course, detent contour 9 and detent spring 10 are also attached or formable the other way around in the control element. An area 11, in which the magnets are held, is formed or attached in each case torsion-proof at the lower end of extension 3. Extension 3 and seat 4 are shown in section, whereas control knob 2 is shown from its side, so that grip area 2 detectable for a user can be seen. Grip area 2 may be made, of course, also of several parts, for example, of a metallic or a metallic two-component plastic and a rubber-elastic surface. As indicated by the broken lines 12, both control knob 2 and seat 4 are made hollow, so that internal part 13, as also extension 3, form hollow-cylinder-shaped parts 3, 13.

If control knob 2 is now moved around its central axis 14 in the direction of arrow P, a relative movement occurs between control knob 2 and seat 4 held rigidly in control element 1. As a result, a freely selectable detent is created simultaneously via detent contour 4 and detent spring 10, whereby the rotary movement occurs over mount 8. Part 11, provided with magnets, of extension 3 moves here over Hall sensors 7, whereby preferably two Hall sensors 7, 15 are used, as is also evident from FIG. 2. Preferably, two detents, distributed in each case along the periphery, are assigned to a magnetized area 16 or 17.

Figure 2:
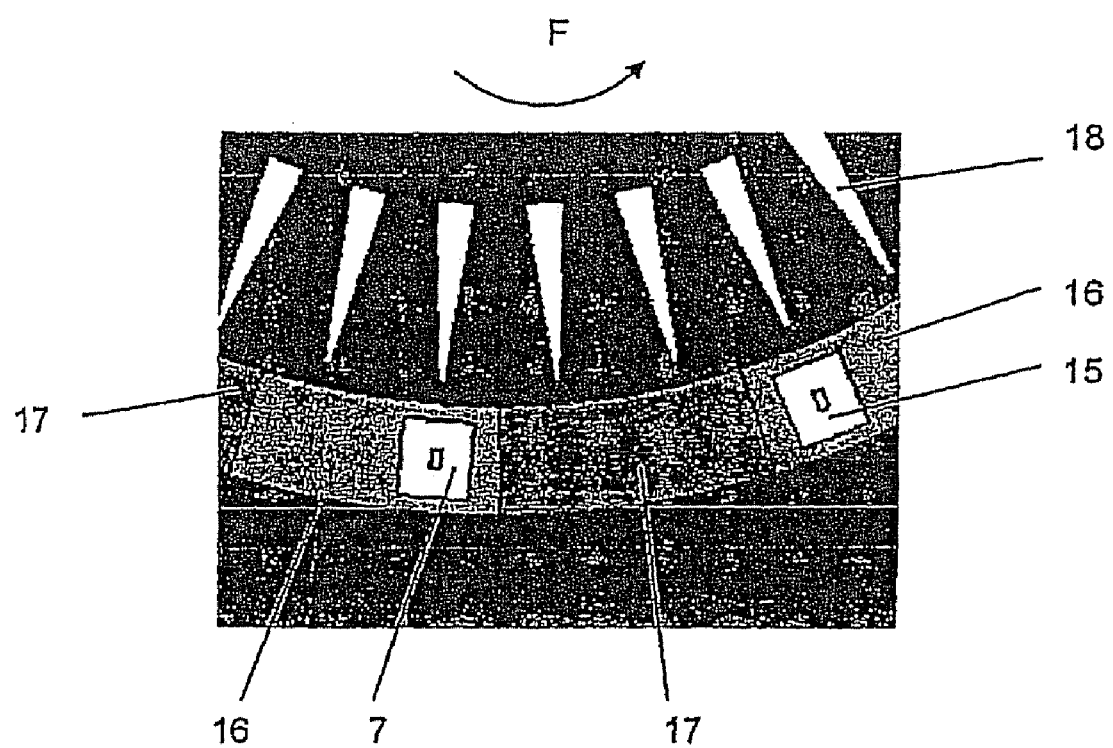
FIG. 2 shows a basic view from the direction of arrow II of FIG. 1.
Figure 3:
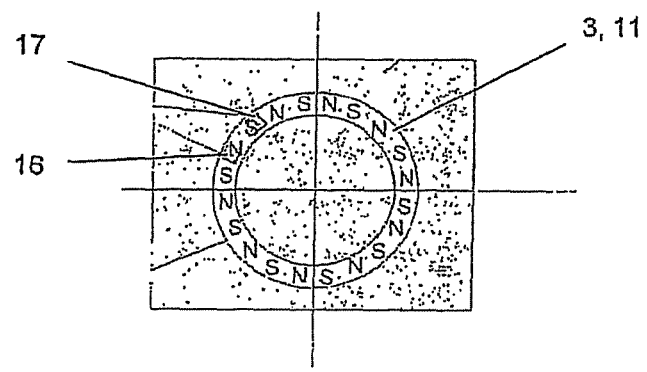
FIG. 3 shows an arrangement of the magnets in the extension of the control knob.

Further, the interplay between Hall sensors 7, 15 and the oppositely polarized magnets 16, 17 is described for a more detailed explanation of the mode of operation of the direction determination and the detection of the switch position. FIG. 2 depicts a basic view from the direction of arrow II of FIG. 1. Hall sensors 7, 15 and a section from extension 3, 11 of control knob 2 can be seen. The arrows 18 indicate the position of the detents, i.e., the individual detent positions during rotation. Permanent magnets 16, 17 are arranged next to one another in extension 3, 11 with different polarities. Thus, it is conceivable, for example, to provide the lighter area 16 with a positive pole and the darker area 17 with a negative pole. It is important here that Hall sensors 7, 15 can detect a magnetic flux difference in the positive or negative direction from the different polarity to enable therewith an evaluation of the rotation direction and the rotary movement. If the positive magnetization of magnet 16 is now designated as north, the negative polarity of magnet 17 can be designated as south. A complete arrangement of magnets 16, 17 with their north and south poles is shown in FIG. 3. It is particularly advantageous here, as shown in FIG. 3, that the magnets do not completely fill areas 16, 17, but that it suffices when area 11, provided with the magnets, is only partially provided with magnets 16, 17. The alternating polarity is essential, however.

Figure 4:
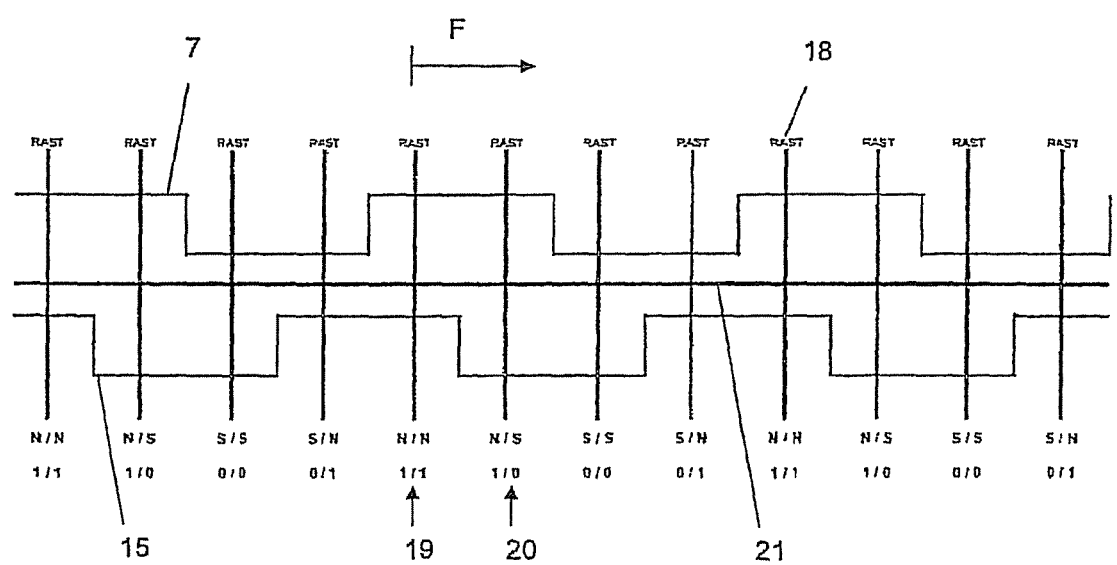
FIG. 4 shows the course of the switching states determined by the sensors as a function of the rotation angle of the control knob.

A course of detected switching states of Hall sensors 7, 15 as a function of the rotation angle and the individual detent positions 18 is shown in FIG. 4. Proceeding from position 19, which is shown in FIG. 2 and is characterized in that both Hall sensors are above a north pole 16, in a subsequent switch each time a 1 is determined as north pole 16, so that switching state 1/1 results. If control knob 2 is now moved in the direction of arrow F, the polarity above Hall sensor 15 changes from north 16 to south 17 and therefore from plus to minus. This corresponds to switch position 20 of FIG. 4, in which the switching state 1/0 is detectable. The detection of the rotation direction is made possible by this type of arrangement of Hall sensors 7, 15 relative to permanent magnets 16, 17. As depicted by way of example, FIG. 4 shows the course of the switching states of Hall sensors 7, 15, whereby the change in the field line strength of the permanent magnets is detected by means of Hall sensors 7, 15. Switching states 19, 20 are shown in FIG. 4 versus rotation angle 21, the rotation angle forming the ordinate of the diagram.

Figure 5:
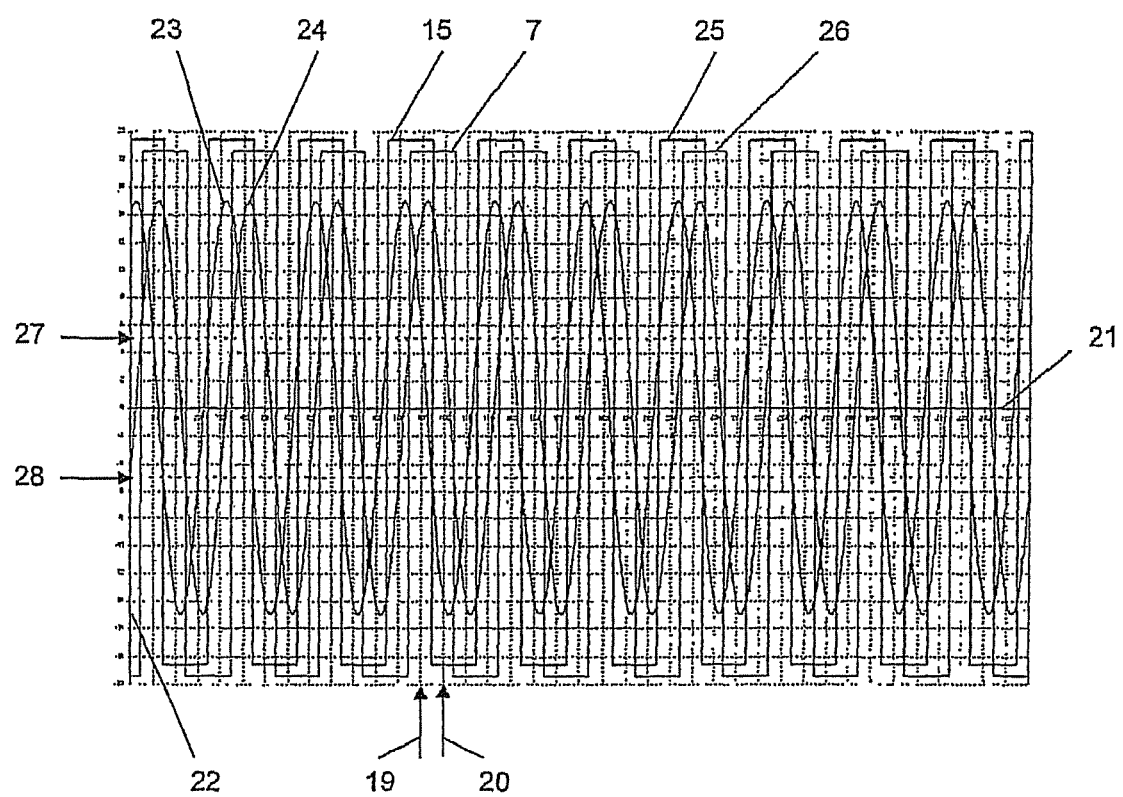
FIG. 5 shows the actual course of the field strengths measured by tests and their course versus the rotation angle.

The actual course of the switching states in an exemplary embodiment of a control element 1 of the invention is depicted in FIG. 5. In this case, the ordinate 22 again designates the rotation angle from 0° to 360° and the corresponding measured value 23, 24 for the determined field line strength of permanent magnets 16, 17 is shown on the abscissa 23. In the actual course of the measured values 23, 24 of the Hall sensors, which correspond to a sinusoidal wave, the switching states 25, 26 resulting therefrom, as they are depicted in FIG. 4, are shown superimposed. Here, the course of curve 23 corresponds to switching state 25 of Hall sensor 15 and the course of curve 24 to switching state 26 of Hall sensor 7. The two switching states 25, 26, described in FIG. 4 according to the exemplary embodiment, were also entered in FIG. 5. It can be seen that to achieve a switching threshold a certain threshold value 27, 28 must be exceeded or underrun.

Hall sensors 7, 15 are placed directly on the present printed circuit board 5. To minimize the tolerances, printed circuit board 5 is oriented by means of auxiliary pivots to rotary actuator 1. It must be noted furthermore that Hall sensors 7, 15 may also be used, which are mounted vertically on printed circuit board 5 and therewith stand opposite at the periphery to extension 3, 11 and corresponding magnets 16, 17.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A control element for a motor vehicle, comprising:
at least one pivoted control knob;
an extension formed on the control knob, the extension having the shape of a hollow cylinder, and having an end face, the end face being substantially orthogonal to a rotary axis of the control knob;
an electrical device configured to detect a rotary movement of the control knob,
the electrical device working together with the extension of the control knob,
the electrical device being formed of at least two oppositely polarized magnets connected torsion-proof to the end face of the extension and by at least two sensors held stationary in the control element and detecting the magnetic field lines of the magnets, the at least two magnets axially elongating the extension from the end face;
a cylindrically shaped seat, the cylindrically shaped seat comprising an internal hollow cylinder shaped part, an outer hollow-cylinder shaped part and a base connecting the internal hollow-cylinder shaped part and the outer hollow cylinder shaped part, the extension being arranged between the outer hollow cylinder shaped part and the internal hollow cylinder shaped part, the control knob being axially offset of the cylindrically shaped seat;
a rotary bearing arranged between the internal hollow-cylinder-shaped part and the extension; and
a printed circuit board, the base of the cylindrical shaped seat being attached to the printed circuit board, the end face connected to the at least two magnets being closer to the printed circuit than any other part of the extension.

2. The control element according to claim 1, wherein the cylindrical extension is a hollow-cylinder-shaped extension and the magnets distributed along the periphery at regular intervals are attached on or in the cylindrical extension.

3. The control element according to claim 1, wherein the magnets are formed integrally on the control knob.

4. The control element according to any claim 1, wherein the sensors are Hall sensors and the Hall sensors are attached horizontally and/or vertically to a printed circuit board held in the control element and electrically contacted.

5. The control element according to claim 4, wherein only one of the Hall sensors experiences a change in the magnetic field during successive predetermined time intervals.

6. A control element for a motor vehicle, comprising:

at least one pivoted control knob;

an extension formed on the control knob, the extension having the shape of a hollow cylinder, and having an end face, the end face being substantially orthogonal to a rotary axis of the control knob;

an electrical device configured to detect a rotary movement of the control knob, the electrical device working together with the extension of the control knob, the electrical device being formed of at least two oppositely polarized magnets connected torsion-proof to the end face of the extension and by at least two sensors held stationary in the control element and detecting the magnetic field lines of the magnets, the at least two magnets axially elongating the extension from the end face;

a cylindrically shaped seat, the cylindrically shaped seat comprising an internal hollow cylinder shaped part and an outer hollow cylinder shaped part, the extension being arranged between the outer hollow cylinder-shaped part and the internal hollow cylinder-shaped part, the control knob being axially offset of the cylindrical shaped seat;

a rotary bearing arranged between the internal hollow-cylinder-shaped part and the extension; and a printed circuit board, the cylindrical shaped seat being attached to the printed circuit board, the end face connected to the at least two magnets being closer to the printed circuit than any other part of the extension.

7. The control element according to claim 6, wherein the cylindrical extension is a hollow-cylinder-shaped extension and the magnets distributed along the periphery at regular intervals are attached on or in the cylindrical extension.

8. The control element according to claim 6, wherein the magnets are formed integrally on the control knob.

9. The control element according to any claim 6, wherein the sensors are Hall sensors and the Hall sensors are attached horizontally and/or vertically to a printed circuit board held in the control element and electrically contacted.

10. The control element according to claim 9, wherein only one of the Hall sensors experiences a change in the magnetic field during successive predetermined time intervals.

* * * * *